June 14, 1960

R. C. THUROW 2,940,371

FOCUSING APPARATUS FOR CAMERA

Filed April 19, 1957

INVENTOR.
RAYMOND C. THUROW
BY
Charles H. Redman
ATT'Y.

_United States Patent Office_

2,940,371
Patented June 14, 1960

2,940,371

FOCUSING APPARATUS FOR CAMERA

Raymond C. Thurow, 4810 Tocora Lane, Madison, Wis.

Filed Apr. 19, 1957, Ser. No. 653,977

2 Claims. (Cl. 95—44)

This invention relates to improvements in photographic apparatus and is more particularly concerned with the novel construction and assembly of focusing apparatus useful in conjunction with a single lens photographic camera having a focus viewing means therein.

More specifically, the apparatus is designed and constructed so as to provide a simple and efficient accessory for adapting a single lens reflex camera of conventional construction for use in photographing subjects that lie short of the usual focal point present in two lens reflex cameras. An example of such use, but by no means a limitation, is found in taking a picture within the oral cavity. To be useful, photographs of this nature must be taken at close range and it is impossible to properly focus a specific area with any degree of accuracy when the photographic lens and the focusing lens are in two different planes. Furthermore, even where fairly accurate focusing is possible by the use of a conventional two lens reflex camera, the patient may move before the diaphragm opening can be adjusted.

Under some conditions of use, such as the photographing of the palate or pharynx, a mirror may be required. In such a case the focusing grid can be projected on and readily be seen in the mirror as an image superimposed on the image of the subject thus giving an exact outline of the viewing area as well as making the focusing procedure simple and highly accurate.

Effective use of a single lens reflex camera without the present accessory is most unsatisfactory because in instances of such detail photography, the camera is necessarily positioned so close to the oral cavity that proper illumination of the subject while seeking to focus is almost impossible. Furthermore, with the use of the present apparatus the depth of focus is accurately indicated and it permits determination with extreme accuracy whether or not one part of the subject will obscure another part in the picture. When a camera is held closely to the oral cavity it is often difficult if not impossible and certainly annoying to the patient for the operator to look into the focusing viewer because of the close proximity of the viewer to the patient's face. The patient also suffers discomfort because of the heat produced by the bright light necessarily used in an attempt to illuminate the subject while focusing.

The herein disclosed apparatus is designed to permit close oral photography with a high degree of accuracy but is not limited to such close work in any respect. Focusing for full facial views or other large subjects is made more accurate and certain with a minimum of effort and time. The apparatus is constructed to have mounted therein a slightly modified conventional single lens reflex camera and it functions in such manner that an illuminated test pattern is focused directly on the subject. The camera may be of the type having a viewing opening including a focusing screen that normally is closed by a hinged closure. This closure is removed and the conventional focusing screen is supplemented with a test pattern of any practical design which may be imprinted directly on the screen or provided on an overlay sheet therefor.

The instant construction enables the operator to bring the camera into focus simply by projecting the test pattern on the subject to be photographed and, when the test pattern is sharply focused on said subject and particularly on the area to be photographed, the picture is taken.

The projection of the required test pattern onto the subject requires a source of good illumination at the viewing opening of the camera and the present assembly includes novel means to house the desired light source in a manner to permit it to be moved easily and quickly so as to allow access to be had to the camera for any purpose whatsoever, including film replacement. Means is provided also to insure adequate heat ventilation of the light housing.

It is therefore an object of the present invention to provide a novel assemblage including a single lens camera adapted for projecting a test pattern onto the focusing plane of subject to be photographed.

Another object is to provide a novel lamp housing and mounting base for a single lens camera and an associated focusing lens mount.

Another object is to provide an apparatus of the character described which is adapted to mount, for cooperation therewith, a conventional single lens reflex camera.

Another object is to provide a camera assembly of the character described which is inexpensive to manufacture, easy to assemble, very efficient and accurate in use, easy to operate and portable.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

Figure 1:
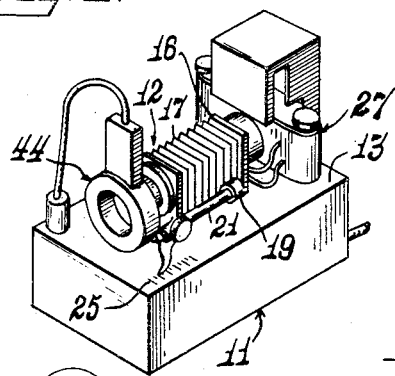
Fig. 1 is a perspective view of the focusing apparatus and showing a single lens reflex camera mounted therein.
Figure 3:
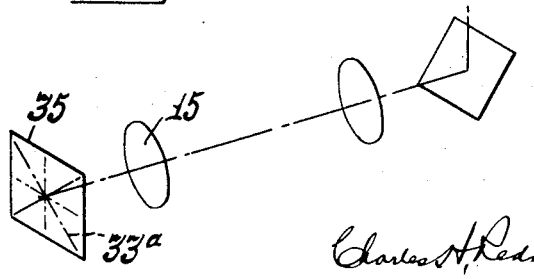
Fig. 3 is a diagrammatic view illustrating the focal pattern.

Referring particularly to the Fig. 1 disclosure, 11 illustrates a base, which may be fabricated in box-like form from sheet metal stock or from a suitable plastic or metal casting. This base is adapted to constitute a casing for various electrical components of the assembly, which components are not illustrated because they constitute no part of the invention. The base 11 has a focusing lens structure, generally indicated at 12, mounted on its top wall 13. This focusing lens structure may include a conventional lens mount 14 at its front end which carries a lens or lens system 15 (Fig. 3). The lens mount 14 is arranged for focusing adjustment relative to a camera mount 16, provided at the other end of the assembly, by the provision of a collapsible tubular structure 17.

The camera mount 16 includes a foot portion 18 secured to the base wall 13 and a pair of integral mounting bosses 19 for mounting laterally spaced horizontal guide rods 21 (only one shown). The lens mount 14 is adjustable along the rods 21, and, accordingly, it is provided with integral bosses 22 (one shown), one for sliding on each rod 21. A thumb wheel 23 is carried by the one boss 22 illustrated to facilitate adjusting and securing of the lens mount 14 after it is adjusted. A focusing pointer 24 also is carried by one boss 22 for cooperation with one or more sets of calibrations 25 on the wall 13. Such calibrations may include one of magnification of film, others for height and width of area of subject, and still another for proper setting for exposure.

The camera mount 16 includes a rearwardly extending sleeve-like portion 26 which is engaged in light-tight association with the conventional lens holder on a reflex camera 27. This engagement mounts the camera in operative association with the focusing apparatus 12. The camera is a conventional type of reflex camera having a focus viewing opening 28 in its top wall and a focusing screen 29 beneath said opening. The camera also includes a reflex mirror means 31 that is pivotally mounted, as at 32, so as to be selectively positioned in the full line position of use illustrated or in the dotted line position shown. The mirror means 31 is adapted to reflect light rays entering the viewing opening and passing downwardly through the focusing screen 29, forwardly through the focusing apparatus 12, and onto the subject to be photographed.

The focusing screen 29 has a test pattern 33 thereon. This pattern may be imprinted or otherwise produced directly on the screen or it may be carried on a transparent overlay. Means is provided in the form of a lamp 34, for directing light rays downwardly through the focusing screen so as to impress an image of the test pattern on the mirror means from where it is reflected through the focusing apparatus 12 and onto the subject 35, as illustrated at 33a in Fig. 3. This focusing of the test pattern on the subject illuminates the subject and permits the operator to determine with great exactitude the precise area which will be photographed and the sharpness of the focus. Otherwise stated, the focusing apparatus is focused, by adjustment of the lens mount 14, so that a clear, sharp image of the test pattern appears on the subject and on the area to be photographed or superimposed over an image of the subject appearing in a mirror.

Figure 2:
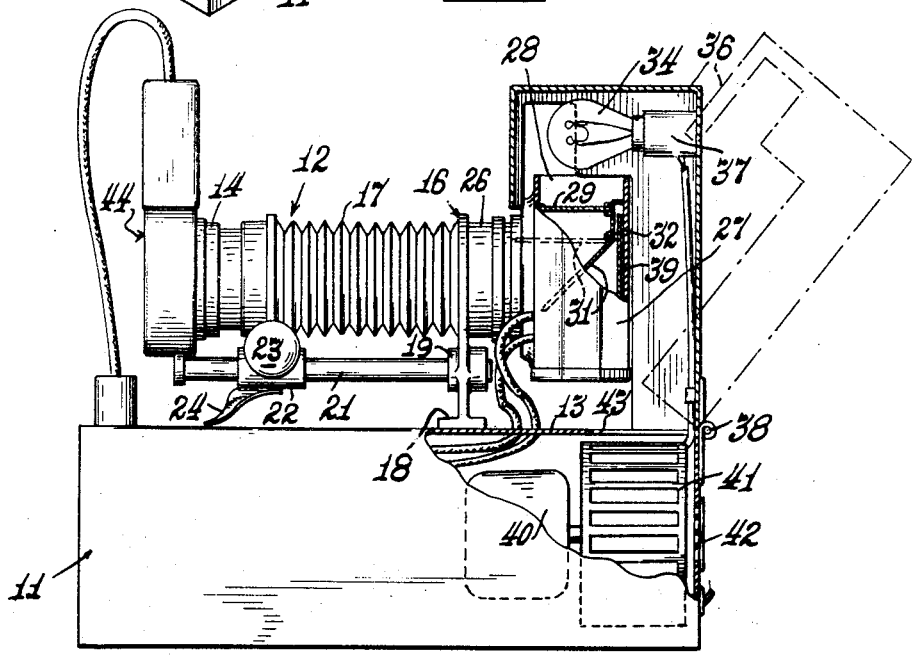
Fig. 2 is a side elevational view of the assembly, showing parts of the apparatus and of the camera broken away and in section.

Outside rays from the lamp 34 are shielded from the subject by a lamp housing 36 which is fabricated from sheet material or moulded. This housing preferably has the lamp socket 37 mounted therein and the housing is hingedly mounted to the base, as at 38, so as to be movable into the full line position of use shown in Fig. 2 or into the dot-dash line position of non-use illustrated. When the housing is in the dot-dash line position, access may be obtained to the camera 27 for removing it from the apparatus or for adjusting the roll of film 39 therein. Lamp replacement may also be effected when the housing is in the dot-dash line position.

The lamp housing 36 and the base 11 are adapted to be ventilated so as to prevent overheating and to this end the base contains a motor 40 and blower fan 41 operable thereby, which directs a flow of air, admitted into the base through one or more vents 42, upwardly through an opening 43 in the top wall 13 and then through the housing 36.

It is preferable, in order to avoid the use of flood lights having questionable value in the case of oral photography, to mount a circular strobic light 44 on the focusing lens mount 14. This light may be so connected in the electrical circuit of the focus lamp 34 and shutter actuator 50 as to be illuminated when the camera shutter is operated and the light 44 extinguished. Inasmuch as the specific electrical circuit connecting these electrical components is not novel and is not complex, it is not illustrated.

As many possible embodiments may be made in the invention, and as many changes might be made in the embodiment above set forth, it is to be understood that all matters hereinbefore set forth or shown in the accompanying drawings are to be interpreted as illustrative and not in a limiting sense.

Having thus described the invention, what is claimed as new and desired to be secured by Letters Patent is:

1. A combination camera and focusing apparatus comprising a single lens camera having a reflex mirror arranged between the lens thereof and the film to reflect light rays entering a viewing opening toward the lens and onto the subject to be photographed, a base mounting the camera, a source of illumination outside of and adjacent to the viewing opening, a housing substantially enclosing said source of illumination so as to direct substantially all light rays therefrom through said viewing opening, a focusing screen in the path of said light rays, a test pattern on said screen adapted to have its image reflected through the lens by said mirror means, a focusing lens structure on said base in axial registration with the camera lens and through which light rays pass, and means to adjust said focusing lens structure to focus the test pattern image on the subject.

2. A camera and focusing apparatus combination comprising a single lens reflex camera, a test pattern screen and a focusing apparatus, said focusing apparatus including a base structure, a focusing lens assembly mounted on said base structure, a housing pivotally mounted on said base structure and spaced from said focusing lens assembly, a source of illumination carried in said housing for directing light downwardly toward the base structure when the housing is in one pivotal position, said camera being mounted on said base structure between the focusing lens assembly and housing and beneath said source of illumination when the housing is in said one position, said camera including a lens arranged in register with the focusing lens assembly, a reflex mirror pivotally mounted in said camera between said lens and a light sensitive film arranged in said camera, a viewing opening in the camera above said mirror and located beneath said source of illumination, said test pattern screen being arranged in said viewing opening between the source of illumination and said mirror, and said mirror being movable into a first position to reflect light entering the camera through the test pattern screen outwardly therefrom through the said lens and focusing lens assembly and onto a subject to be photographed and into a second position to permit light entering the said lens through the focusing lens assembly to strike said film.

References Cited in the file of this patent

UNITED STATES PATENTS

| | | |
|---|---|---|
| 920,516 | Adlon | May 4, 1909 |
| 1,088,030 | Leeds | Feb. 24, 1914 |
| 1,297,329 | Davis | Mar. 18, 1919 |
| 1,346,319 | Konieczny | July 13, 1920 |
| 1,559,936 | Butehorn | Nov. 3, 1925 |
| 1,918,206 | Ermisch | July 11, 1933 |
| 2,282,045 | Fleischer | May 5, 1942 |
| 2,641,980 | Brunk | June 16, 1953 |
| 2,642,790 | Scholkemeier | June 23, 1953 |
| 2,665,620 | King et al. | Jan. 12, 1954 |
| 2,682,603 | Dine et al. | June 29, 1954 |
| 2,744,444 | Breitman | May 8, 1956 |
| 2,760,048 | Schulte | Aug. 21, 1956 |

FOREIGN PATENTS

| | | |
|---|---|---|
| 182,428 | Switzerland | Feb. 15, 1936 |
| 647,857 | Great Britain | Dec. 20, 1950 |
| 815,743 | Germany | Oct. 4, 1951 |
| 479,287 | Canada | Dec. 11, 1951 |